K. P. McELROY.
MANUFACTURE OF CHLORHYDRINS.
APPLICATION FILED JUNE 22, 1915.
1,253,615.
Patented Jan. 15, 1918.
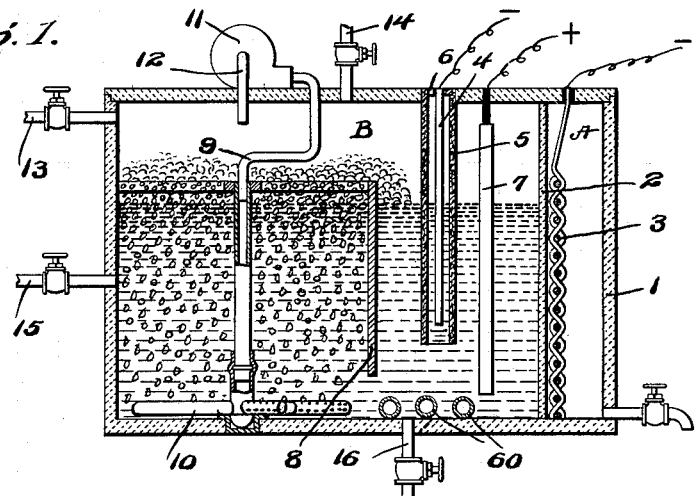
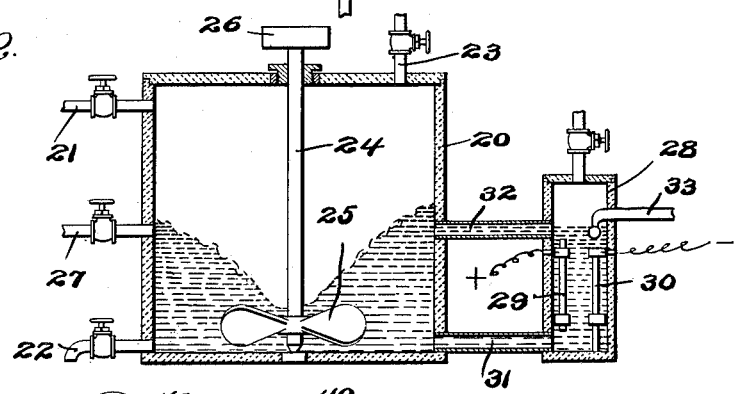
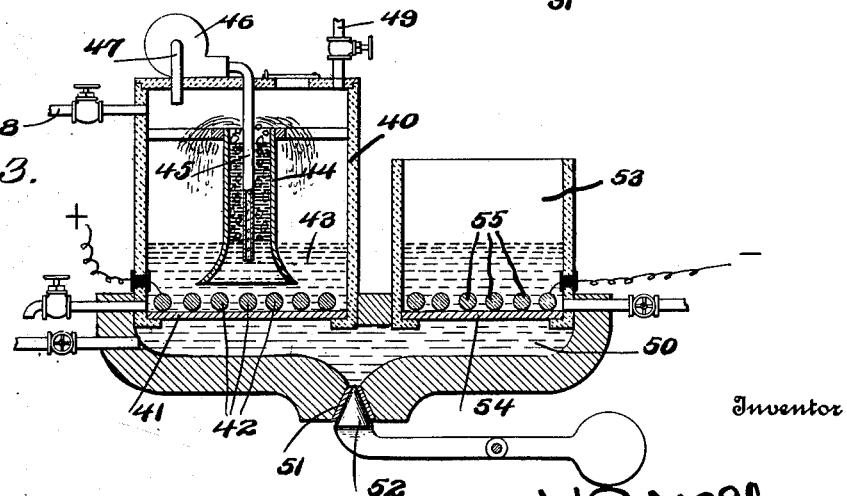
Inventor
K. P. McElroy.

UNITED STATES PATENT OFFICE.

KARL P. McELROY, OF WASHINGTON, DISTRICT OF COLUMBIA, ASSIGNOR TO CHEMICAL DEVELOPMENT COMPANY, OF WASHINGTON, DISTRICT OF COLUMBIA, A CORPORATION OF MAINE.

MANUFACTURE OF CHLORHYDRINS.

1,253,615.  Specification of Letters Patent.  Patented Jan. 15, 1918

Application filed June 22, 1915. Serial No. 35,505.

*To all whom it may concern:*

Be it known that I, KARL P. MCELROY, a citizen of the United States, residing at Washington, in the District of Columbia, have invented certain new and useful Improvements in the Manufacture of Chlorhydrins, of which the following is a specification.

This invention relates to the manufacture of chlorhydrins; and it comprises a method of producing chlorhydrins or chlorinated alcohols from oil gas and other gas rich in or consisting of olefins wherein an aqueous bath or liquid is maintained saturated or impregnated with such olefins while chlorin or hypochlorous acid is supplied to or developed in said bath or liquid, development advantageously being by electrolytic means, at least in part; and it further comprises as a new and useful composition of matter for solvent and other purposes a mixture of the chlorhydrins corresponding to the olefins of oil gas, such mixture being a clear, heavy liquid of pleasant odor, having a boiling point, when in a dry condition, between 125° and 135° C., being freely volatile at or below 100° C. in the presence of water vapor, being soluble in several times its volume of water and being an excellent solvent of cellulose acetate and other coating materials; all as more fully hereinafter set forth and as claimed.

The olefins are hydrocarbons of the general formula $C_nH_{2n}$ and are classed as "unsaturated" compounds since the hydrogen present is not enough to saturate the combining power of the carbon. Being unsaturated bodies they are comparatively reactive and unite or combine directly with various other chemical substances. With chlorin they combine readily and quickly, adding two atoms and giving what are known as the olefin chlorids; bodies of the general formula $C_nH_{2n}Cl_2$. Ethylene, $C_2H_4$, for example, takes up two atoms, or one molecule, of chlorin, $Cl_2$, additively and forms ethylene chlorid, or "Dutch liquid," $C_2H_4Cl_2$. Dutch liquid is a heavy oily material wholly insoluble in water and having an odor and other properties much like those of chloroform. The other olefin chlorids are similar. These olefin chlorids are bodies possessed of useful characteristics as solvents and for other purposes though not at present made commercially.

The olefin chlorids are supposed to be the only products of the action of chlorin upon the olefins when the reaction, which is apt to be violent, is so controlled as not to take place destructively or give higher chlorinated products. I have however found that this assumption is erroneous and that formation of olefin chlorids as a sole product only goes on under certain conditions; one of these conditions being the absence of any great amount of water or its vapor in the sphere of action. In the presence of $H_2O$, that is of water as liquid or as vapor (steam), there is a tendency toward the formation of chlorhydrins in lieu of olefin chlorids, and with an ample amount of water diluting the reacting bodies at the time of their mutual action the formation of olefin chlorids may be wholly or substantially wholly restrained. It is largely a question of the relative concentration or masses of the three reacting bodies, the chlorin, the olefin and the water; or, stated in another way, of the dilution of the chlorin and olefin by the water. The diluting water in the sphere of reaction may be present either as liquid or as vapor (steam).

The chlorhydrins so formed are bodies entirely different from the olefin chlorids in structure and properties, being nearly related to the alcohols. They are chlorinated alcohols. Ordinary, or ethyl, alcohol for example is $CH_3.CH_2OH$ while ethylene chlorhydrin is $CH_2Cl.CH_2OH$, differing from alcohol in containing one chlorin atom replacing a hydrogen atom. Ethylene chlorhydrin is freely soluble in water, propylene chlorhydrin is fairly soluble and the other chlorhydrins are also more or less soluble. Being at once alcohols and chlorinated bodies, the chlorhydrins are excellent solvents for varnish making and other purposes. They are also well adapted to serve as raw materials for producing the wide variety of other oxygen-containing olefin derivatives which are only known as laboratory products:—glycols, olefin oxids, acetates, benzoates, nitrates, etc. The chlorhydrins being soluble in water and quite reactive are readily converted into these other bodies by simple and economical methods whereas the olefin chlorids although also so convertible are convertible only with difficulty.

In making chlorhydrins by the present method, the net result of the interaction of the three reacting bodies, the olefin, the chlorin and the water, is that the water, HOH, gives up one H to one Cl of the $Cl_2$ to form HCl while the residual .OH and the other Cl unite with the olefin to form the chlorhydrin, $C_nH_{2n}OHCl$. Half the chlorin used appears in the chlorhydrin and half as hydrochloric acid (or as a chlorid if a base be present). Whether these actions are simultaneous or successive probably depends upon circumstances and is not here particularly important. Chlorin in acting upon water hydrolyzes to some extent forming HCl and HClO, or hypochlorous acid, and hypochlorous acid will unite with olefins to give chlorhydrins. In working under the present invention in some instances, as in electrolytic operation hypochlorous acid is usually formed as an intermediate product, at least to some extent, and then reacts with the olefin, while in others, as in causing an interaction between steam, chlorin and olefin gas at high temperatures or as in passing chlorin into olefin-impregnated solution containing much hydrochloric acid, hypochlorous acid cannot well exist except transitorily.

Where free hypochlorous acid does occur it is not desirable that it be present as such to any substantial extent in the sphere of reaction since it is a body of extraordinary instability readily breaking up under the influence of light, heat, catalysts, acids, alkalis, etc. The hypochlorites are more stable but do not form chlorhydrin except to the extent that they dissociate with formation of free hypochlorous acid. In a bleaching liquor formed by electrolysis of neutral NaCl solution there is some free HClO formed by dissociation and this will form a little chlorhydrin but the action stops as soon as any substantial amount of free NaOH appears since caustic alkalis break up the chlorhydrins.

While the present method is applicable to the production of pure chlorhydrins from pure olefins, such as ethylene, propylene, the butylenes, the amylenes, etc., I regard it as particularly applicable to the treatment of oil gas and similar gases rich in mixtures of the olefins. The mixed olefins of oil gas give a mixture of chlorhydrins which for technical purposes behaves like a unitary body since the boiling points of these chlorhydrins are very nearly the same while the mixture combines a good solvent power for cellulose acetates and other varnish materials with a relation to water and steam which makes it easy to produce and recover by distillation. I shall therefore hereinafter speak more particularly of oil gas.

In making chlorhydrins from oil gas in an aqueous bath or liquid in the present invention, I keep the bath continuously impregnated or saturated with olefins by violently agitating it in the presence of the gas or otherwise producing an intimate contact of gas and liquid. The presence of an excess of dissolved olefins during the reaction has several important functions. It increases the rate of chlorhydrin production and, which is more important, it acts to shield the chlorhydrin once produced from further action by the chlorin or hypochlorous acid; it acts as a protective agent against further oxidation, chlorination or destruction. While the solubility of most of the olefins in aqueous liquids is very little indeed in absolute weight, being generally not to exceed a few hundredths per cent., yet I have found that the rate of solution is relatively rapid so that by violent agitation or effective filming out of the liquid in the presence of the gas maintenance or replenishment of impregnation or saturation offers no great difficulty. It is a mechanical matter of increasing the effective contact of gas and liquid to the highest possible degree. Absorption is of course strictly proportional to the surface offered by the liquid to contact of the gas. Chlorin or hypochlorous acid is supplied to or formed in the saturated or impregnated liquid at a rate corresponding to the rate of solution of the olefins and to the velocity of chlorhydrin formation. Electrolytic generation of chlorin or hypochlorous acid offers an easy method of regulating the supply. Where chlorhydrins alone are desired, control of the operation is easily practicable by watching the character of the final product. If it is not wholly soluble in water, olefin chlorids are being formed and the rate of solution of the olefins must be increased or the supply of chlorin diminished.

Many variations in operation are possible within the limits of the described method. In making chlorhydrins with hydrochloric acid as a by-product, water may be impregnated with oil gas and chlorin led in slowly; the rate and manner of introduction being such that it dissolves and does not escape as bubbles to mix with the gas, in which case more or less olefin chlorid may be produced. During the operation, the liquid is kept impregnated with the gas by the use of suitable mechanical means. The liquid is gradually converted into an aqueous solution of hydrochloric acid and chlorhydrins. The latter may be recovered by fractional distillation in the manner hereinafter indicated. If the liquid is kept at the boiling temperature the chlorhydrins, mixed with some acid and some water, go forward with the waste gases and may be condensed out by cooling.

Instead of causing solution of chlorin and gas in a body of water for reaction therein, I may directly mix gas and chlorin in an atmosphere of water vapor as by introducing chlorin and gas by steam injectors in a vapor filled chamber; but this mode of operation I do not specifically claim herein, it forming the matter of my copending application Serial No. 34,678; but in the accompanying claims wherein I recite "H₂O," I wish it to be understood that by "H₂O" I mean the chemical substance "water" whether such water be in the liquid form or the vapor form (steam).

In working with an aqueous bath or body of liquid, the supply of chlorin may be much quicker and the operation accelerated without risk of formation of olefin chlorids if the liquid contains materials capable of reacting with the hydrochloric acid to form chlorids, but the hydrochloric acid is lost as a by-product. Most of the basic oxids or carbonates may be used for this purpose, as for instance mercuric oxid, copper oxid, zinc oxid, alumina, magnesia, etc. Carbonate of lime, carbonate of soda, carbonate of potash, carbonate of magnesia, etc., may be employed but dilute the effluent gas with carbon dioxid and reduce its value for combustion, etc. Caustic alkalis in excess are not suitable since they form non-reactive hypochlorites, chlorates, etc. Caustic alkalis also tend to decompose the chlorhydrins.

An advantageous method of operation is to use a liquid containing preformed hypochlorites, such as an emulsion of bleaching powder (chlorid of lime), electrolytic bleaching liquors, etc. and dissolve chlorin and gas in it. In the presence of hypochlorites the chlorin reacts to form a chlorid of the base and set free hypochlorous acid. Each molecule of chlorin sets free one molecule of HClO and forms another molecule of HClO. Instead of chlorin, carbon dioxid, which sets free hypochlorous acid, may be used.

Where rapid operation and also the production of hydrochloric acid are desired, this may be effected by an expedient which consists in the use of salts of polyvalent acids, such as sulfates, phosphates, etc., in the absorbing liquid. These allow formation of chlorids and facilitate rapid absorption of chlorin while by heating after evaporation of the liquid, they produce hydrochloric acid again. Ordinary phosphate of soda is suitable for this purpose.

The best mode of operation however involves electrolytic production of chlorin or hypochlorous acid since it not only makes possible easy control of conditions but also avoids waste of chlorin in formation of chlorids or hydrochloric acid. Many types of electrolytic cells and modes of operation may be used within the limits of the present invention, the gas being introduced as an anodic depolarizer.

In one advantageous form of the present invention, I may use a diaphragm cell having three electrodes; one cathode being beyond the diaphragm and another cathode and the anode being located in a brine chamber provided with means for impregnating the cell liquid with gas. By appropriate use of the three electrodes, an amount of alkali corresponding to the amount of chlorin entering into combination with chlorhydrin, is removed beyond the diaphragm. In the solution of NaCl the sodium is of course exactly equivalent to the chlorin and if chlorin is removed as chlorhydrin the bath tends to become alkaline. The secondary cathode obviates this. The same result of maintaining or increasing the ratio of Cl to Na may be obtained in another modification of this invention by introducing chlorin from another source into an electrolytic cell producing chlorhydrin, the amount so introduced being equal to that which is converted into chlorhydrins. In still another mode of operation, a 3-chamber cell with two diaphragms may be employed. In the anode chamber is maintained an excess of any suitable basic body not forming hypochlorites and the anode liquor is kept charged with gas while in the cathode chamber soda is formed in the usual way. The intermediate chamber serves as a sort of trap for base. Evolving chlorin in the anode chamber forms chlorhydrins and hydrochloric acid and the acid combines with and is neutralized by the base in the usual way. The base traveling toward the cathode chamber is precipitated in the intermediate chamber by alkali diffusing from the cathode chamber and may be collected from time to time and returned to the anode chamber. Some of the alkali from the cathode chamber may of course be added to the intermediate chamber or to the anode chamber from time to time. Mercuric oxid is the best base to use in this embodiment of my invention since the mercuric chlorid formed has little tendency to leave the anode chamber and has the further great advantage that its presence considerably enhances the solubility of the olefins in the liquid. Zinc oxid, copper oxid, alumina, magnesia and many other bases may however also be used.

Any oil gas may be used in the present invention which has not been "fixed" or otherwise treated by exposure to a high temperature; but it is best to use one made at a moderately low temperature, say around 700° C., by passing crude petroleum, gas oil, heavy residues, etc., through a hot tube or retort. Highly naphthenic oils are not as good as "paraffin base" oils. Working under ordinary conditions of pressure with an iron retort, such gas will run about 45 to 50 per cent. total olefins, ethylene, propylene, butylenes and amylenes; 35 per cent. or more being ethylene and propylene together. The relative proportions of the various olefinic gases will however vary considerably with the method of manufacture and purification adopted. Gasification under reduced pressure gives a better and richer gas. An expedient which leads to economy in oil is to return to the gasifying zone a portion of the waste gas after the olefins have been absorbed therefrom, gasifying the oil in its presence. With return of some gas and the use of reduced pressures important economies in oil may be secured.

Instead of making oil gas by gasifying oil in a retort, the gases formed in stills used for distilling petroleum may be employed. The gas given off in the first stages of distillation is not ordinarily rich in olefins but that from the later stages, and especially in cracking, is often quite rich.

Instead of oil gas, a gas made by coking coal or charring wood at low temperatures under reduced pressures may be employed; but oil gas I consider the best material.

The oil gas may be submitted to the usual cooling, scrubbing and purifying operations to remove unchanged oil, tar, sulfur, etc. In making the particular chlorhydrin mixture of the present invention, readily condensable olefins should also be removed. The gas usually contains some acetylene, or bodies of the acetylene series, which should be removed. This may be done by passing the gas over metallic copper at 250 to 300° C., or by scrubbing it with a solution of copper acetate, a magma containing copper hydrate, etc. A magma formed by precipitating copper sulfate solution with lime works efficiently. Whether the gas be further treated depends upon the character of the gas and the nature of the chlorhydrins desired. If a mixture of ethylene and propylene chlorhydrins be desired, while other methods of purification may be used, the gas is best next compressed to 75 or 100 pounds and cooled. This removes by condensation the bulk of the butylenes and amylenes; which may be separately used in the present process to produce the corresponding chlorhydrins. Or the gas may be scrubbed with a little chilled oil which also removes these bodies. The use of larger amounts of scrubbing oil removes too much of the ethylene and propylene as well. A combined treatment by compressing, chilling and scrubbing with cold oil gives a particularly clean gas containing mainly ethylene, propylene, ethane, methane and a little hydrogen. Ethane, methane and hydrogen are inert in the present process. The presence of a little residual butylene and amylene in the gas is however often desirable.

Ethylene or propylene made from other sources and in a pure state may be used in the present process; ethylene, for example being readily producible by hydrogenating acetylene in the presence of catalysts. Pure olefins produce pure chlorhydrins. But as stated, the mixture of chlorhydrins made from the mixed olefins of oil gas is, for the present purposes, more desirable than the pure individual chlorhydrins.

Where pure chlorhydrins are required for any purpose it is more economical to produce the mixture of the present invention, break up with soda to make olefin oxids, fractionate these oxids and then reconvert to chlorhydrins with hydrochloric acid.

With this mixture of chlorhydrins, recovery from any of the solutions produced as described is easy and convenient since the mixture distils readily with steam, goes over with the first portions of distillates and tends to separate therefrom as an oil sinking to the bottom of a saturated solution. In recovery, the water solution which may be acid or neutral is distilled in a column still, giving a milky distillate of a mixture of oil and saturated solution which readily separate on standing. The saturated solution may be redistilled and the oily liquid dehydrated with salt or calcium chlorid. It is then marketable. If the oil is distilled from an acid solution it may be treated with a little sodium bicarbonate or chalk prior to dehydration.

In the accompanying illustration I have shown, more or less diagrammatically, certain organizations of apparatus elements useful in performance of the described process. In this showing, Figure 1 is a vertical section of an electrolytic cell adapted to remove excess of base in making chlorhydrin;

Fig. 2 is a similar view of another type adapted to maintain the chlorin ratio by introduction of chlorin from another source; and Fig. 3 is a similar view of a third cell adapted for neutralization of acid in the anode chamber.

In the structure of Fig. 1, reference numeral 1 indicates as a whole a cell made of any usual material and spanned by diaphragm 2 to give alkali chamber A and reaction chamber B. Cathode 3 is located in chamber A and cathode 4 in chamber B. The latter cathode is surrounded by porous tube 5 provided with means 6 for venting hydrogen. Close to the diaphragm is anode 7. Dash wall 8 is provided for circulation purposes. Beyond the dash wall is tube 9 carrying at its base several minutely perforated arms 10, which may be, as shown, mounted revolubly on the tube. Fan 11 on the top of the cell draws gas from the upper part of chamber B at 12 and delivers it continuously to the tube thus keeping the gas in the chamber in continuous cyclic circulation to, through and back to the electrolyte. Advantageously the fan is speeded up to maintain the liquid beyond the dash wall as a more or less foamy emulsion. Fresh gas enters at 13, continuously or discontinuously, and waste gas is vented at 14. Fresh electrolyte may be supplied at 15 and valved outlet 16 used for removing chlorhydrin solution.

In the structure of Fig. 2, reaction chamber 20 is provided with gas inlet 21, liquid outlet 22 and gas outlet 23. Within it is rotating shaft 24 carrying propeller 25 and driven by pulley 26. Fresh electrolyte may be supplied by inlet 27. Connected to this reaction chamber is an electrolytic chamber 28, containing cathode 29 and anode 30. Conduits 31 and 32 place the two chambers in connection and permit circulation of liquid by the propeller. Inlet conduit 33 for chlorin is provided.

In the structure of Fig. 3, anode chamber 40 is closed at the bottom by diaphragm 41, carrying anode 42. Within this chamber is a body of liquid 43 which may be kept charged with basic materials, such as mercury oxid. Circulation and gas impregnation are provided by tubular casing 44, depending into which is gas pipe 45 from circulating fan 46. The fan takes gas from the chamber through 47. The chamber is provided with gas inlet 48 and gas outlet 49. Below the anode chamber is oxid trap or chamber 50 provided with outlet 51, closed by plug valve 52. Above this chamber is cathode chamber 53, separated therefrom by diaphragm 54 and having cathode 55.

In the use of any of these devices the electrolyte is usually a solution of common salt, NaCl, of about 10 per cent. strength although stronger and weaker solutions may be used. A solution of potassium chlorid or any other chlorid may be used.

With the cell of Fig. 1, gas is introduced at 13 under any desired pressure and fan 11 placed in motion to maintain the liquid as a more or less foamy mass and keep it saturated or impregnated with olefins. On now passing current through the two cathodes and the anodes chlorin (or hypochlorous acid) is generated and combines with the dissolved olefins. A corresponding amount of alkali is transferred to cathode 3 in chamber B in order to restrain development of alkalinity in the liquid in A. Cooling coils 60 may be used to keep down the temperature. From time to time, waste gas may be vented through 14. It is a useful expedient not to try to carry the absorption of olefins too far in this chamber but to vent the gas early and send it to another similar apparatus for retreatment. This prevents current fluctuations and permits more rapid operation. As a rule, the ethylene is less rapidly taken up than the propylene and the butylenes, etc. and if the gas be vented when only partially exhausted it will be relatively rich in ethylene. It is desirable that this ethylene shall also be converted into chlorhydrin. When this is done in a second chamber, the electrolyte should be mixed with that from the first cell since a mixture of propylene and ethylene chlorhydrins is easier to recover than ethylene chlorhydrin alone. Presence of ethylene chlorhydrin is also desirable in the mixture of chlorhydrins.

In the structure of Fig. 2, the propeller 25 keeps the liquid impregnated with olefins and also maintains the liquid in circulation through the two chambers. As the chlorin or hypochlorous acid produced by anode 30 is taken up by the olefin, the electrolyte tends to become alkaline and this is obviated by the introduction of chlorin at 33.

In the structure of Fig. 3, fan 46 gives a cyclic circulation of chamber gas and delivers it in 44 which operates like an air-lift pump, producing thorough impregnation. As current passes, chlorin is formed, or tends to form, in liquid 43 and combines with the olefin, while the acid simultaneously developed is taken up by the base present forming chlorids. Any chlorid diffusing into chamber 50 is precipitated therein by caustic alkali from cathode chamber 53. In the case of mercuric oxid, an occasional addition of cathode liquid to the anode chamber is useful.

The accumulating chlorhydrins produced in any of the three cells tend to separate as oil if the operation is long continued since though soluble in water their solubility is lessened by the presence of salt. If the salt solution is 10 per cent. or less in strength separated oil will sink; if it be saturated with salt, it will float. The electrolyte may be removed from time to time, distilled to free it of chlorhydrins and returned for service anew. With the cells of Figs. 1 and 3 continual additions of more salt are necessary since chlorin and alkali are continuously passing out of the system. With that of Fig. 2 the amount of salt remains constant.

If the operation in any of these cells be pushed, some olefin chlorids may be formed. As stated these are also useful bodies. When formed since they are insoluble they separate as heavy oils, taking with them much of the chlorhydrins. The chlorhydrins may be separated and recovered by washing the oils with water and distilling the washings.

The described apparatus may be used for converting oily olefins, such as amylenes, hexylenes, pentylenes, etc., into corresponding chlorhydrins, the gas circulating means shown serving equally well to keep these olefins emulsified with the cell liquid. The produced chlorhydrins however being more soluble in oils than in water pass into the liquid olefins and from time to time the oils must be removed from the cell and fractionally distilled to recover the olefins which are then returned to the cell.

Other halohydrins, such as bromhydrins may be produced in the manner described for chlorhydrins if a bromid, such as sodium bromid, be used as electrolyte with production of bromin. The bromhydrins are not as soluble as the chlorhydrins but otherwise behave much like them. Bromhydrins are not commercially as desirable as chlorhydrins because of the high price of bromin, but they are even easier than the chlorhydrins to convert into other olefin products. For example in making olefin acetates, bromhydrins may be produced in the cell with the aid of sodium bromid, heated with sodium acetate to form the acetate and reform sodium bromid and the sodium bromid returned to the cell.

It is obvious that a number of cells may be advantageously arranged in series as regards gas feed in order to secure progressive exhaustion of the olefins.

The waste gas after removal of the olefins from oil gas to such an extent as may be desired is still of high thermal value and may be used for heat, light and power. Advantageously, it may be used in a gas engine to furnish power to develop electric current. A portion of it may be returned to the gasifying zone with advantage in making oil gas.

In the present invention the groups .OH and .Cl are added to the olefin and it is therefore both oxidized and chlorinated. In making chlorhydrin by electrolysis it is of course the object to add these two groups, and whether the .OH and the Cl be directly and simultaneously produced by the action of the current, or whether the .OH is, so to speak, a secondary product of the reaction of $Cl_2$ on water, or on water and olefin at the same time, is unimportant. Similarly, as regards hypochlorous acid HOCl it is unimportant whether the OH and Cl groups actually combine to form this body prior to uniting with the olefin or do not. The net result sought in this invention, whether using preformed chlorin or electrolyzing a chlorid solution, is to form a chlorhydrin by union of .OH and .Cl to an olefin.

While the primary object of my invention, as described in the present application is the manufacture of chlorhydrins, yet it is obvious that where electrolysis is employed and chlorin is not introduced from an outside source, the process may equally well be regarded as one for making alkali since an amount of alkali equivalent to the amount of chlorhydrin is necessarily produced in electrolyzing sodium or potassium chlorid, and this alkali is removed and recovered. Considered as an alkali-making process it has the advantage that the anodic depolarization effected by the oil gas or olefins results in an economy of power. In another application Serial No. 35,646 I have described and claimed a way of making alkali utilizing this method of anodic depolarization wherein instead of maintaining an anolytic liquid bath saturated or impregnated with gas the anode is separated from the chlorid bath by a diaphragm and directly exposed to an atmosphere of gas.

What I claim is:—

1. In the manufacture of halohydrins, the process which comprises causing a halogen and an olefin to react in the presence of sufficient $H_2O$ to prevent a substantial formation of an olefin halid.

2. In the manufacture of halohydrins, the process which comprises causing a halogen and oil gas to react in the presence of sufficient $H_2O$ to insure a substantial formation of a halohydrin.

3. In the manufacture of chlorhydrins, the process which comprises causing chlorin and an olefin to react in the presence of sufficient $H_2O$ to insure a substantial formation of a chlorhydrin.

4. In the manufacture of chlorhydrins, the process which comprises causing chlorin and oil gas to react in the presence of sufficient $H_2O$ to prevent a substantial formation of olefin chlorid.

5. In the manufacture of chlorhydrins, the process which comprises causing chlorin and an olefin to react in the presence of sufficient liquid water to prevent a substantial formation of olefin chlorid.

6. In the manufacture of chlorhydrins, the process which comprises causing chlorin and oil gas to react in the presence of sufficient liquid water to prevent a substantial formation of olefin chlorids.

7. In the manufacture of chlorhydrins, the process which comprises maintaining an aqueous liquid impregnated with an olefin while supplying chlorin thereto.

8. In the manufacture of chlorhydrins, the process which comprises maintaining an aqueous liquid impregnated with oil gas while supplying chlorin thereto.

9. The process of making useful products which comprises subjecting a gaseous olefinic hydrocarbon to limited anodic oxidation with a chlorid electrolyte.

10. The process of making useful products which comprises electrolyzing a sodium chlorid solution in the presence of olefinic hydrocarbon, such hydrocarbon being one which is normally gaseous, as an anodic depolarizer.

11. In the manufacture of chlorhydrins, the process which comprises maintaining a liquid impregnated with an olefinic gas and during such maintenance electrolytically developing chlorin therein.

12. In the manufacture of chlorhydrins, the process which comprises maintaining a solution containing dissolved chlorids impregnated with oil gas and during such maintenance electrolyzing the solution.

13. In the manufacture of chlorhydrins, the process which comprises electrolyzing a chlorid solution kept impregnated with olefinic gas while maintaining a normal ratio of chlorin to base therein.

14. In the manufacture of chlorhydrins, the process which comprises electrolyzing a chlorid solution kept impregnated with olefinic gas while maintaining a normal ratio of chlorin to base therein by removing a portion of the base developed.

15. In the manufacture of chlorhydrins, the process which comprises impregnating a chlorid solution with oil gas while passing electric current therethrough and maintaining the normal ratio of chlorin to base therein, continuing the operation till a desired proportion of chlorhydrins is formed, removing the electrolyzed liquid, removing chlorhydrins therefrom and returning the liquid for further electrolysis and production of chlorhydrins.

16. In the manufacture of chlorhydrins, the process which comprises electrolyzing a chlorid solution in a chamber in such a manner as to remove from the chamber a portion but not all of the base developed therein and during such electrolysis violently agitating said solution with oil gas.

17. In the production of chlorhydrins, the process which comprises maintaining a bath of chlorid solution impregnated with oil gas and during such maintenance passing current through an anode and a cathode in such bath and also through a secondary cathode separated from such bath by a diaphragm.

18. In the production of halogen derivatives of the olefins, the process which comprises electrolyzing a solution of a halogen salt while maintaining such solution impregnated with olefinic gas.

19. As a new composition of matter a solvent liquid composed of the chlorhydrins corresponding to the gaseous olefins of oil gas, such liquid being heavier than water, boiling in a dry state between 125° C. and 135° C. with the greater portion boiling below 130° C., boiling in a moist state somewhat below 100° C., being miscible with several times its volume of water and being a solvent for cellulose esters.

20. The process of manufacturing chlorhydrins which comprises producing a gaseous mixture containing an olefin and a saturated hydrocarbon and treating said mixture to add to said olefin a chlorin atom and an alcohol radical.

21. The process which comprises producing a gaseous mixture containing a gaseous olefin and a saturated hydrocarbon and flowing said gas in intimate contact with an aqueous solution capable of delivering a halogen atom, whereby a substantial proportion of the olefin reacts with a portion of said solution to form the chlorhydrin of said olefin.

In testimony whereof, I affix my signature.

K. P. McELROY.